United States Patent
Payne et al.

(10) Patent No.: US 7,154,041 B2
(45) Date of Patent: Dec. 26, 2006

(54) DOUBLE WALL ISOLATED REMOTE ELECTRONIC ENCLOSURE APPARATUS

(75) Inventors: Robert K. Payne, Waseca, MN (US); Loren D. Dietz, Owatonna, MN (US); Mitchell B. Austin, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 11/121,357

(22) Filed: May 4, 2005

(65) Prior Publication Data

US 2005/0263314 A1    Dec. 1, 2005

Related U.S. Application Data

(60) Provisional application No. 60/568,284, filed on May 5, 2004.

(51) Int. Cl.
*H02G 3/08*    (2006.01)
(52) U.S. Cl. .................. 174/67; 174/17 R; 174/520; 220/3.2; 220/3.8; 361/600; 361/601
(58) Field of Classification Search ............. 174/50, 174/53, 57, 58, 52.1, 52.4, 66, 67, 520, 524, 174/17 R; 220/3.2, 3.3, 3.4, 3.5, 3.6, 3.7, 220/3.8, 241, 242; 439/535, 536, 949; 361/600, 361/601, 664, 665, 666, 667, 668, 676, 679, 361/688
See application file for complete search history.

(56) References Cited

U.S. PATENT DOCUMENTS

| | | | |
|---|---|---|---|
| 3,793,563 A | 2/1974 | Brefka | |
| 4,092,698 A | 5/1978 | Brefka | |
| 4,640,985 A | 2/1987 | Martin et al. | |
| 5,049,810 A | 9/1991 | Kirby et al. | |
| 5,066,906 A | 11/1991 | Moore | |
| 5,088,004 A | 2/1992 | Howell | |
| 5,107,203 A | 4/1992 | Timko | |
| 5,134,544 A | 7/1992 | Howell | |
| 5,181,166 A | 1/1993 | Howell | |
| 5,270,639 A | 12/1993 | Moore | |
| 5,306,178 A * | 4/1994 | Huang | 174/67 |
| 5,364,290 A | 11/1994 | Hartman | |
| 5,476,731 A | 12/1995 | Karsten et al. | |
| 5,774,328 A | 6/1998 | Rector et al. | |
| 5,825,303 A | 10/1998 | Bloss, Jr. et al. | |
| 6,084,395 A | 7/2000 | Thiel | |
| 6,100,816 A | 8/2000 | Moore | |
| 6,162,082 A | 12/2000 | Karsten et al. | |
| 6,316,932 B1 | 11/2001 | Horan et al. | |
| 6,492,589 B1 * | 12/2002 | Smith | 174/50 |
| 6,522,124 B1 | 2/2003 | Ballard | |
| 6,545,217 B1 * | 4/2003 | Sato | 174/50 |
| 6,773,652 B1 | 8/2004 | Loy et al. | |
| 6,797,884 B1 * | 9/2004 | Kubota | 174/66 |
| 6,891,104 B1 * | 5/2005 | Dinh | 174/67 |
| 6,894,223 B1 * | 5/2005 | Shotey et al. | 174/67 |
| 6,928,728 B1 | 8/2005 | Walding, Jr. et al. | |

* cited by examiner

*Primary Examiner*—Angel R. Estrada
(74) *Attorney, Agent, or Firm*—Patterson, Thuente, Skaar & Christensen, P.A.

(57) ABSTRACT

Moisture-resistant electronic enclosures and methods of enclosing and isolating an electronic metering device are disclosed. The electronic enclosure can be adapted for metering devices, such as in automatic meter reading and other consumption measuring application, and includes a double-wall, isolated configuration. The apparatus and method of the invention thereby protect metering or other electronic components from moisture, dust, and other environmental debris.

16 Claims, 5 Drawing Sheets

SECTION A-A

DOUBLE WALL ISOLATED REMOTE ELECTRONIC ENCLOSURE APPARATUS

RELATED APPLICATIONS AND CLAIM TO PRIORITY

This application claims priority to U.S. Provisional Patent Application No. 60/568,284, filed on May 5, 2004, and entitled "DOUBLE WALL ISOLATED REMOTE ELECTRONIC ENCLOSURE APPARATUS," which is incorporated herein by reference in its entirety.

FIELD OF THE INVENTION

The invention relates generally to meter enclosures, and more particularly to waterproof electronic meter enclosures.

BACKGROUND OF THE INVENTION

Automatic meter reading (AMR) systems are generally known in the art. Utility companies, for example, use AMR systems to read and monitor customer meters remotely, typically using radio frequency (RF) communication. AMR systems are favored by utility companies and others who use them because they increase the efficiency and accuracy of collecting readings and managing customer billing. For example, utilizing an AMR system for the monthly reading of residential gas, electric, or water meters eliminates the need for a utility employee to physically enter each residence or business where a meter is located to transcribe a meter reading by hand.

Remote meters operating as part of AMR systems are typically mounted externally on a building, pipe, pole, or other structure, or in a pit, exposing the meters to a variety of climate conditions. While meter electronics are capable of operating in a variety of environment temperatures, the function and performance of remote meters and their associated components are adversely affected by moisture. Further, although remote meters can be successfully shielded or protected from rain or snow, it is difficult to protect the remote meters from high humidity.

Previous solutions include fully encapsulating remote meters that are exposed to humid or wet environments. These meter housings are expensive with respect to both component materials and manufacturing costs. Completely encapsulating a remote meter also affects the engineering and design of the meter, adding to the overall cost of the remote meter and decreasing the cost-savings associated with implementing an AMR system.

There is, therefore, a need in the industry for a remote meter housing that addresses the cost and design shortcomings of current meter housings while providing effective protection of electronic components from moisture.

SUMMARY OF THE INVENTION

The present invention substantially meets the aforementioned needs of the industry, in particular by providing a double wall isolated remote meter enclosure apparatus. The enclosure apparatus provides effective protection of electronic meter components from moisture and is less expensive to manufacture and implement than current meter enclosures.

In one preferred embodiment, a moisture-resistant electronic enclosure adapted for use in metering applications comprises a main housing, a main housing cavity lid, a main housing cover, and a mounting plate. The main housing preferably comprises a back wall having an interior surface and an exterior surface, and a sidewall extending laterally from the interior surface, the sidewall having a distal end portion, longitudinal side portions, a top portion between the side portions and opposite the distal end portion, an interior sidewall surface, and an exterior sidewall surface, the interior sidewall surface and the interior surface of the back wall defining a main housing cavity. One embodiment of the main housing cavity lid is interengageable with the main housing and comprises an interior lid surface and an exterior lid surface. The main housing cavity is bounded by the interior lid surface. The main housing cover comprises first and second cover walls and a cover sidewall laterally joining the first and second cover walls on at least three sides. An interior surface of each the first and second cover walls and cover sidewall defines an air gap between the main housing cover and each the main housing and the main housing cavity lid, and a distal end portion of the cover sidewall comprises an aperture through which the main housing cover slidably interengages with the main housing. In one embodiment, the main housing cover further comprises a fastening assembly removably coupleable with the main housing. The mounting plate is coupled to the exterior surface of the main housing in one embodiment and can be integral with the main housing in another embodiment.

According to another preferred embodiment, a moisture-resistant electronic enclosure adapted for use in metering applications comprises a main housing, a bottom lid and top lid each interengageable with the main housing, and a main housing back plate. The main housing comprises a back wall having an interior surface and an exterior surface, and a sidewall extending laterally from the interior surface, the sidewall having first and second end portions each disposed between first and second side portions, an interior sidewall surface, and an exterior sidewall surface in one embodiment. The interior sidewall surface and the interior surface of the back wall define a main housing cavity having at least one main housing subcavity. The bottom lid preferably is interengageable with the main housing within a main housing subcavity and comprises an interior lid surface bounding the main housing subcavity on one side and an exterior lid surface defining an air gap between the bottom lid and the interior surface of the back wall. The top lid has an interior lid surface and an exterior lid surface, the interior surface bounding the main housing subcavity on another side to form a potting cavity. The main housing back plate is preferably interengageable with the main housing and has an interior plate surface and an exterior plate surface in one embodiment. The main housing cavity is bounded on at least one side by the interior plate surface, the interior plate surface further defining an air gap between the main housing back plate and the exterior lid surface of the top lid.

Methods for enclosing and isolating an electronic metering device are also disclosed. In one embodiment, a a moisture resistant enclosure comprising a main housing, a main housing cavity lid coupleable to the main housing and defining a main housing cavity, and a main housing cover slidably interengageable with the main housing, an interior surface of the main housing cover defining an air gap between the main housing cover and each the main housing and the main housing cavity lid, is supplied. An electronic metering device is arranged within the main housing cavity and the main housing cavity lid is secured to the main housing to enclose the main housing cavity, forming a double-wall isolated enclosure by placing the main housing cover over the main housing. The double-wall isolated enclosure can then be mounted for interconnection with other metering components. The method can also comprise the step of potting the main housing cavity.

In another embodiment, a moisture resistant enclosure comprising a main housing, a top lid and a bottom lid disposed within the main housing and bounding at least a portion of a main housing subcavity, and a main housing back plate interengageable with the main housing, an interior surface of the main housing defining an air gap between the main housing and an exterior surface of the bottom lid, and an interior surface of the main housing back plate defining an air gap between the main housing back plate and an exterior surface of the top lid, are supplied. An electronic metering device is arranged within the main housing subcavity between the top lid and the bottom lid, and the main housing back plate is secured to the main housing to form a double-wall isolated enclosure. The double-wall isolated enclosure can then be mounted for interconnection with other metering components.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
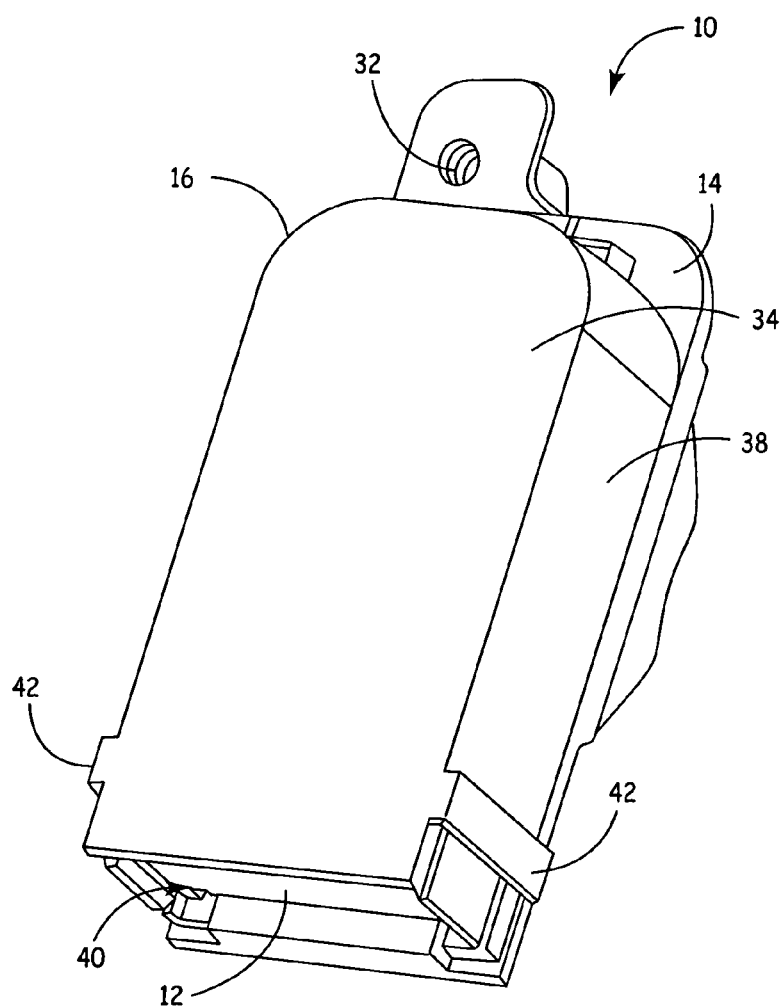
FIG. 1 is a perspective view of an enclosure according to one embodiment of the invention.
Figure 2:
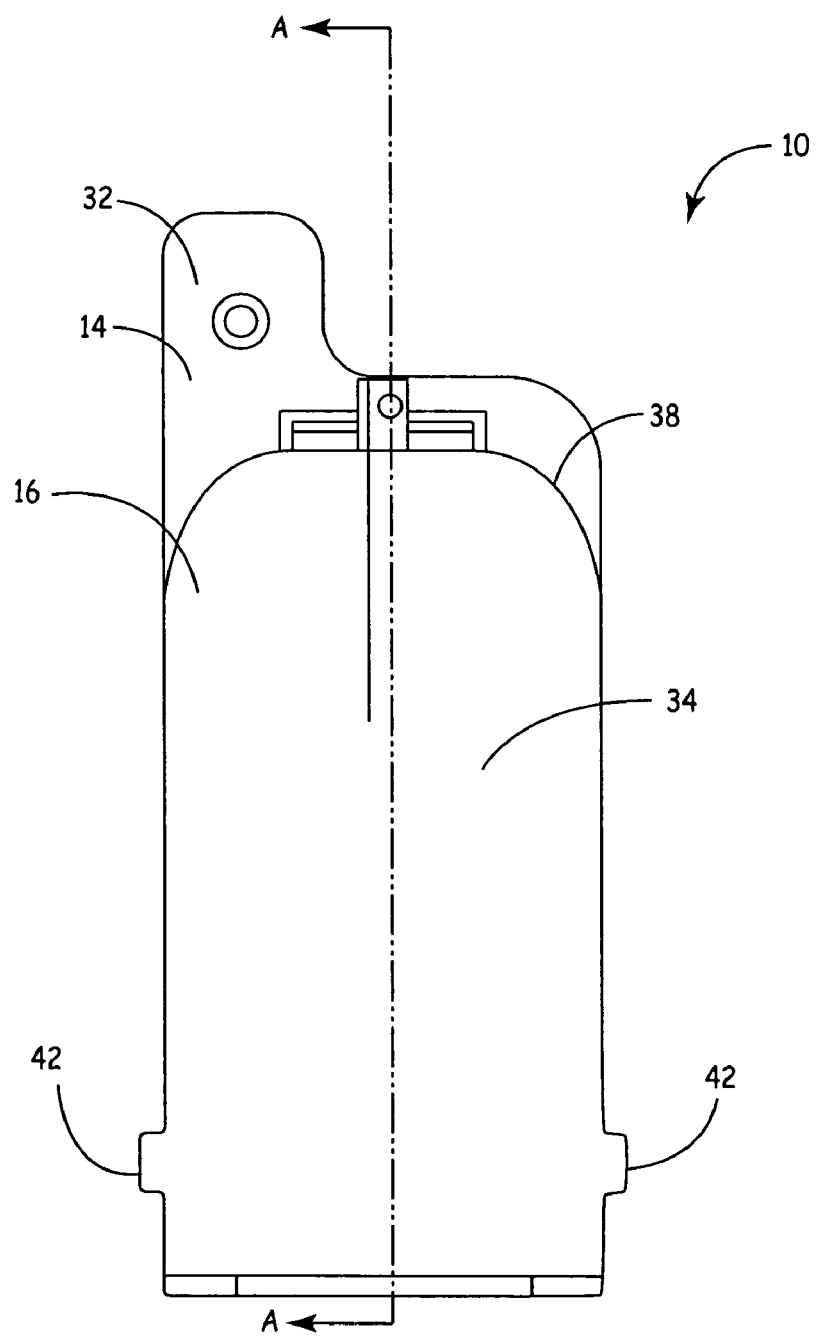
FIG. 2 is a front view of the enclosure of FIG. 1.
Figure 3:
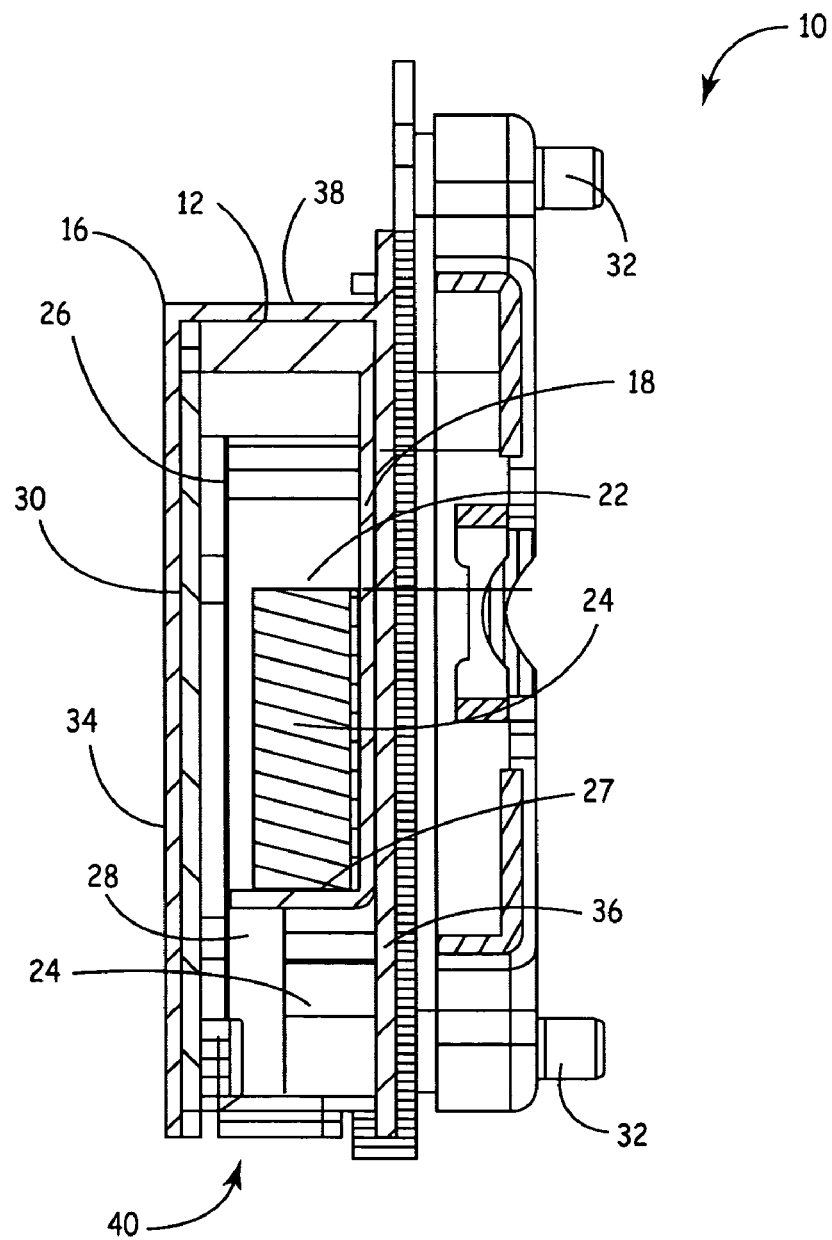
FIG. 3 is a side sectional view of the enclosure taken along line A—A of FIG. 2.
Figure 4:
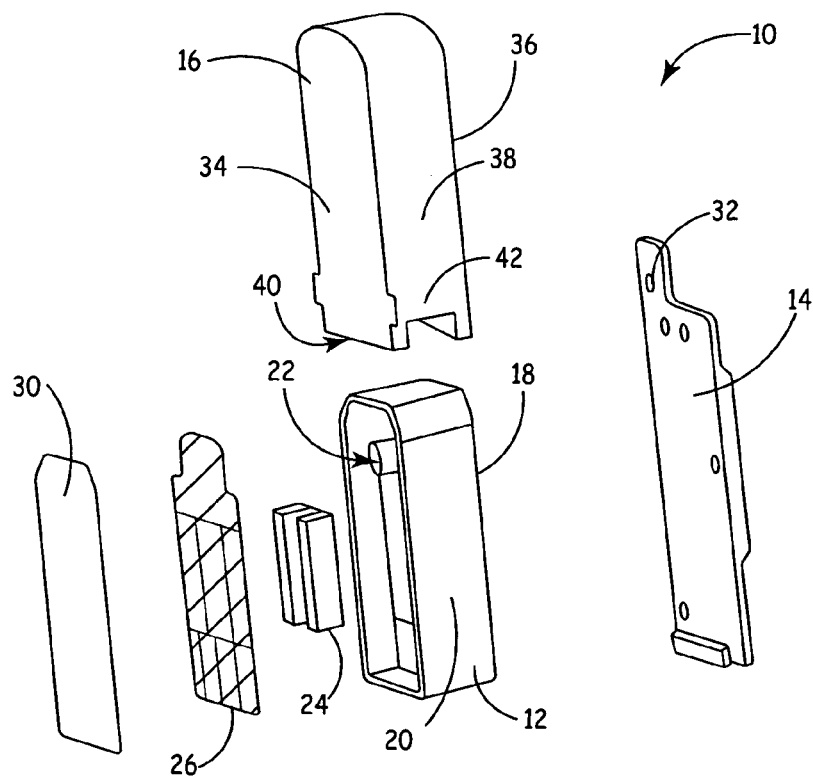
FIG. 4 is an exploded view of the enclosure of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The double wall isolated remote electronic enclosure apparatus disclosed herein minimizes the affect of moisture and liquid water on meter electronics while reducing the associated part and manufacturing costs. The invention can be more readily understood by reference to FIGS. 1–5 and the following description. While the invention is not necessarily limited to such an application, the invention will be better appreciated using a discussion of example embodiments in such a specific context.

Referring to FIGS. 1–4, an enclosure 10 comprises a main housing 12, a mounting plate 14, and a main housing cover 16 in one preferred embodiment. Main housing 12 comprises a back wall 18 and a sidewall 20 that define an internal main housing cavity 22 to house a power source 24, such as a battery or other cell, a printed circuit assembly 26, and/or other electronic components, and to isolate components 24 and 26 from housing cover 16 and other external walls. Back wall 18 and sidewall 20 can be sized or arranged to mount or isolate printed circuit boards and electrical components of varying sizes and configurations in other embodiments of the invention.

In one embodiment, main housing 12 comprises one or more interior walls 27 to define at least one subcavity 28 of cavity 22. Subcavity 28 can house other specialized electronic components necessary or desired for particular applications and uses of enclosure 10.

Enclosure 10 further comprises a main housing cavity lid 30. Lid 30 preferably is secured in place, for example by snapping, ultrasonic welding, or otherwise fastening, to enclose cavity 22, and/or subcavity 28, and cover electronic components 24 and 26.

Mounting plate 14 preferably comprises mounting means 32 for directly mounting enclosure 10 to a pipe, wall, or other structure in one embodiment. For example, mounting means 32 as depicted in the embodiment of FIGS. 1–4 comprise an interface for a pipe bracket to secure enclosure 10 to a pipe. Mounting means 28 can also comprise a built-in bracket, clamp, fastener, fastener or hardware aperture, interface, and the like for mounting or otherwise securing enclosure 10 to a structure. In one preferred embodiment, mounting plate 14 is integral to main housing 12.

Housing cover 16 completes the double-wall isolation of the internal electronic components and preferably slides over and interengages main housing 12. Housing cover 16 comprises first and second substantially parallel cover walls 34 and 36 joined by a lateral sidewall 38, a distal end portion of sidewall 38 comprising an aperture 40 through which housing cover 16 slidably engages main housing 12. A fastening assembly 42 removably couples cover 16 with housing 12. Fastening assembly 42 can comprise, for example, snap fasteners or other interlocking means, such as fasteners with corresponding apertures and the like.

The double-wall isolated design of enclosure 10 protects electronic components 24 and 26 from moisture, dust, insects, and other environmental debris in part by increasing the amount of time required for moisture to breach enclosure 10. Housing cover 16 and housing 12, including lid 30, form a three-layer barrier in conjunction with an air gap defined between an interior surface of cover 16 and housing 12 and lid 30. Thus, moisture must penetrate outer cover 16, saturate the air gap, and subsequently penetrate housing 12 and lid 30 prior to reaching and affecting internal electronic components 24 and 26. The double-wall isolated design of enclosure 10 therefore reduces the amount of moisture or other matter to which electronic components 24 and 26 are exposed. When used in remote meter applications, for example gas, water, or other utility meters, enclosure 10 improves reliability and functionality of electronic components housed therein and reduces field maintenance requirements. These benefits improve the overall efficiency and cost-effectiveness of AMR and other metering systems.

Figure 5:
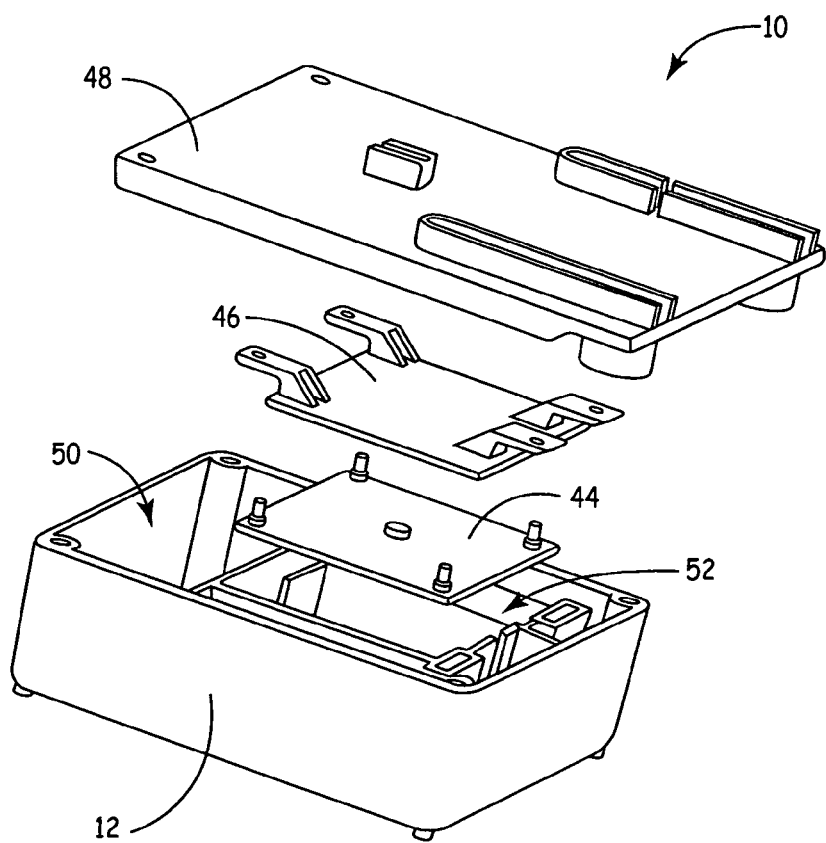
FIG. 5 is an exploded view of an enclosure according to one embodiment of the invention.

FIG. 5 is an exploded view of another preferred embodiment of enclosure 10. Enclosure 10 according to one preferred embodiment of the invention includes main housing 12, which can house a power source, a printed circuit board, and other electronics, and which forms a first line of protection from the ambient environment; a bottom lid 44, which creates a bottom double wall when interengaged with housing 12 and can be adapted to mount, secure, or otherwise hold a printed circuit board and other components; a top lid 46, which is adapted to enclose the electronics, forms one of the double walls with housing 12, and also creates a potting cavity for pit applications; and a housing back plate 48, which forms an exterior wall and can be adapted to mount or otherwise affix enclosure 10 to a pipe, wall, or other structure by a pipe bracket interface, a fastener, a fastening aperture, a mounting bracket, a clamp, and the like. A subcavity 52 of main cavity 50 is thereby formed between bottom plate 44 and top plate 46 when plates 44 and 46 are in place within housing 12. Enclosure 10 therefore further comprises an isolated circuit subcavity 52 within housing 12 and cavity 50, the cavity having an air gap separating the outer walls of housing 12 and back cover 48 from plates 44 and 46, respectively.

Enclosure 10 preferably comprises a molded plastic but can also comprise other durable and moisture-impermeable materials suitable for indoor or outdoor mounting known to those skilled in the art. The particular design, size, arrangement, and configuration of main housing 12, cavities 22 and 24 or 50 and 52, and other components of enclosure 10 can vary or be customized according to the specific application or use of enclosure 10 while maintaining the double-wall isolated design described above with reference to the preferred embodiments of FIGS. 1–5.

For example, enclosure 10 is preferably designed for compatibility with a wide range of meter products manufactured by different companies, including those used in various global regions and countries. Accordingly, preferred embodiments of enclosure 10 can be customized for AMR and general electrical distribution systems used in these varied areas. Enclosure 10 can be further adapted in other embodiments for pit environments, in which enclosure 10 is submersed. For example, main housing 12 or enclosure 10 subsurfaces can be potted to create a seal around any leads, wires, or other interconnects extending from the interior of enclosure 10 to the exterior, preventing water intrusion in the case of submersion of enclosure 10. In another embodiment, the enclosure 10 is submersed in a pit without any potting of leads, wires, and other interconnects within the enclosure subsurfaces of the double wall enclosure.

A preferred embodiment of the invention therefore also comprises a method of enclosing and isolating electronic components located in a humid or wet area. Referring by way of example to the embodiment of FIGS. 1–4, but not excluding the embodiment of FIG. 5 and other preferred embodiments, electronic components 24 and 26, for example electronic utility meter components, are mounted in main housing 12 of enclosure 10. Lid 30 is secured, forming a first main wall of protection from moisture, water, dust, and other debris. Housing cover 16 is placed over main housing 12, defining an air gap between housing cover 16 and main housing 12. Cover 16 in communication with main housing 12 forms double-wall isolated electronics enclosure 10. Enclosure 10 is then mounted via mounting means 32 to a wall, pipe, or other structure for interconnection with other meter or electronic components and integration into an AMR system, for example.

The apparatus and method of the invention therefore protect meter or other electronic components from moisture, dust, and other environmental debris. The invention also reduces the costs associated with manufacturing electronics enclosures and eases integration of meters or other electronic components into new or existing AMR systems.

The invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A moisture-resistant electronic enclosure adapted for use in metering applications, comprising:
    a main housing comprising a back wall having an interior surface and an exterior surface, and a sidewall extending laterally from the interior surface, the sidewall having a distal end portion, first and second longitudinal side portions, a top portion between the first and second side portions and opposite the distal end portion, an interior sidewall surface, and an exterior sidewall surface, the interior sidewall surface and the interior surface of the back wall defining a main housing cavity;
    a main housing cavity lid interengageable with the main housing and comprising an interior lid surface and an exterior lid surface, the main housing cavity bounded by the interior lid surface;
    a main housing cover comprising first and second cover walls and a cover sidewall laterally joining the first and second cover walls on at least three sides, an interior surface of each the first and second cover walls and cover sidewall defining an air gap between the main housing cover and each the main housing and the main housing cavity lid, a distal end portion of the cover sidewall comprising an aperture through which the main housing cover slidably interengages with the main housing, the main housing cover further comprising a fastening assembly removably coupleable with the main housing; and
    a mounting plate coupled to the exterior surface of the main housing.

2. The enclosure of claim 1, wherein the fastening assembly is removably coupleable with the mounting plate.

3. The enclosure of claim 1, wherein the mounting plate comprises a pipe bracket interface.

4. The enclosure of claim 1, wherein the mounting plate comprises at least one of a fastener, a fastening aperture, a mounting bracket, and a clamp.

5. The enclosure of claim 1, wherein the main housing comprises at least one interior wall extending from the interior surface to define at least two main housing subcavities.

6. The enclosure of claim 1, wherein the main housing cavity is adapted to house a power source.

7. The enclosure of claim 1, wherein the main housing cavity is adapted to house a printed circuit board.

8. The enclosure of claim 1, wherein at least a portion of the main housing is potted for a pit environment.

9. The enclosure of claim 1, wherein the mounting plate is integral to the main housing.

10. A moisture-resistant electronic enclosure adapted for use in metering applications, comprising:
    a main housing comprising a back wall having an interior surface and an exterior surface, and a sidewall extending laterally from the interior surface, the sidewall having first and second opposing end portions each disposed between first and second side portions, an interior sidewall surface, and an exterior sidewall surface, the interior sidewall surface and the interior surface of the back wall defining a main housing cavity having at least one main housing subcavity;
    a bottom lid interengageable with the main housing within a main housing subcavity and comprising an interior lid surface bounding the main housing subcavity on one side and an exterior lid surface defining an air gap between the bottom lid and the interior surface of the back wall;

a top lid interengageable with the main housing and having an interior lid surface and an exterior lid surface, the interior surface of the top lid bounding the main housing subcavity on another side to form a potting cavity; and a main housing back plate interengageable with the main housing and having an interior plate surface and an exterior plate surface, the main housing cavity bounded on at least one side by the interior plate surface, the interior plate surface further defining an air gap between the main housing back plate and the exterior lid surface of the top lid.

11. The enclosure of claim 10, wherein the exterior plate surface comprises at least one of a pipe bracket interface, a fastener, a fastening aperture, a mounting bracket, and a clamp.

12. The enclosure of claim 10, wherein the potting cavity is adapted to secure a printed circuit board.

13. The enclosure of claim 10, wherein the potting cavity is adapted to secure a power source.

14. A method for enclosing and isolating an electronic metering device comprising the steps of:

supplying a moisture resistant enclosure comprising a main housing, a main housing cavity lid coupleable to the main housing and defining a main housing cavity, and a main housing cover slidably interengageable with the main housing, an interior surface of the main housing cover defining an air gap between the main housing cover and each the main housing and the main housing cavity lid;

arranging an electronic metering device within the main housing cavity;

securing the main housing cavity lid to the main housing to enclose the main housing cavity;

forming a double-wall isolated enclosure by placing the main housing cover over the main housing; and mounting the double-wall isolated enclosure for interconnection with other metering components.

15. The method of claim 14, further comprising the step of potting the main housing cavity.

16. A method for enclosing and isolating an electronic metering device comprising the steps of:

supplying a moisture resistant enclosure comprising a main housing, a top lid and a bottom lid disposed within the main housing and bounding at least a portion of a main housing subcavity, and a main housing back plate interengageable with the main housing, an interior surface of the main housing defining an air gap between the main housing and an exterior surface of the bottom lid, and an interior surface of the main housing back plate defining an air gap between the main housing back plate and an exterior surface of the top lid;

arranging an electronic metering device within the main housing subcavity between the top lid and the bottom lid;

securing the main housing back plate to the main housing to form a double-wall isolated enclosure; and mounting the double-wall isolated enclosure for interconnection with other metering components.

* * * * *